Nov. 26, 1940. F. H. MUELLER ET AL 2,222,626
VALVE
Filed Jan. 25, 1939
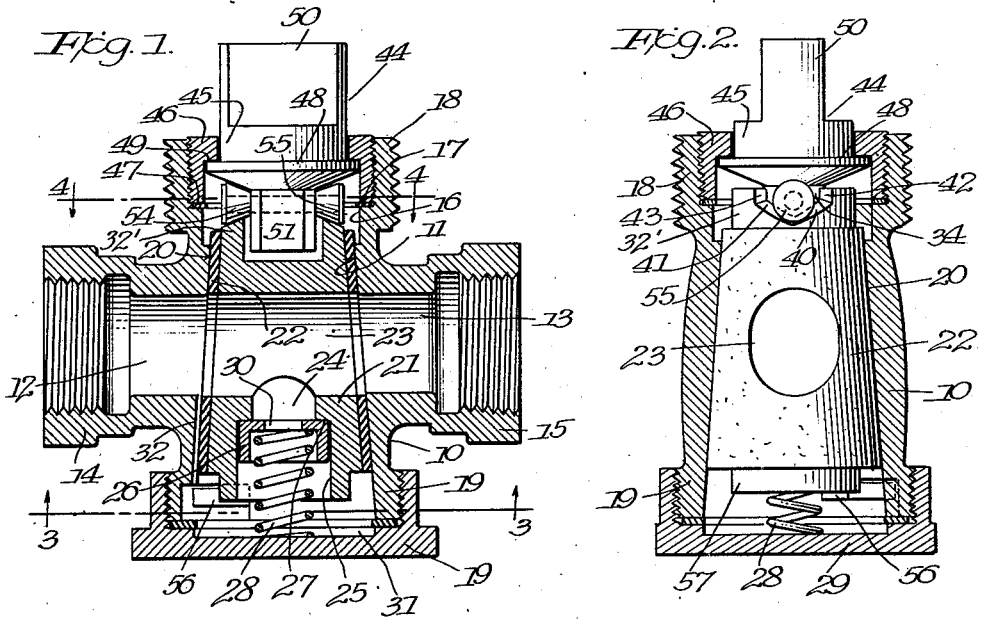
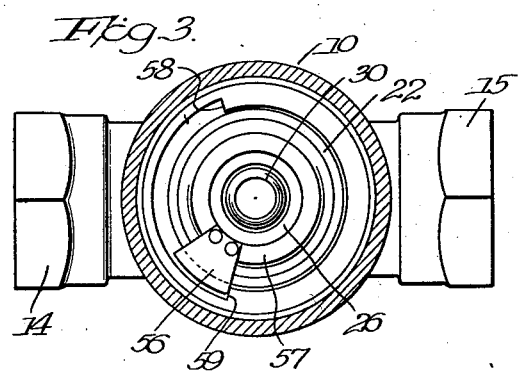
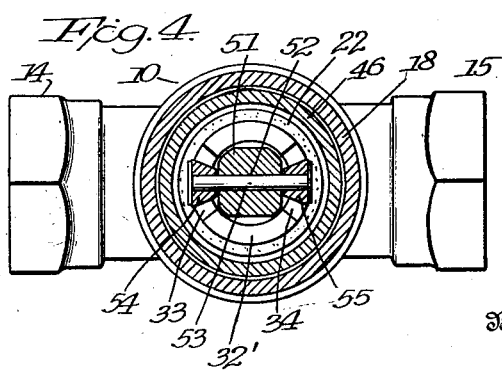
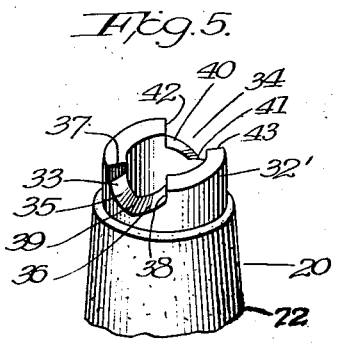
Inventors
Frank H. Mueller
Clarence Pippin
By Cushman Darby & Cushman
Attorneys Patented Nov. 26, 1940

2,222,626

UNITED STATES PATENT OFFICE 2,222,626

VALVE

Frank H. Mueller and Clarence Pippin, Decatur, Ill., assignors to Mueller Co., Decatur, Ill., a corporation of Illinois Application January 25, 1939, Serial No. 252,811

1 Claim. (Cl. 251—97)

This invention relates to valves such, for example as curb stops, and has as an object to provide a valve of superior tightness and yet long wearing in use. To this end the invention particularly contemplates a plug valve with a conical plug, either upright or inverted, the plug being normally firmly seated in the valve body but being automatically loosened by axial displacement prior to being turned. For the purpose of securing the best possible seal a rubber sleeve is preferably interposed between the plug and the valve seat and this sleeve may form either a part of the seat or a part of the plug.

In order that the invention may be fully understood it will be described with reference to the embodiment shown by way of example in the accompanying drawing.

In the drawing:

Figure 1 is an axial section of the new valve;

Figure 2 is an axial section taken at right angles to the section of Figure 1;

Figure 3 is a section substantially on line 3—3 of Figure 1;

Figure 4 is a section substantially on line 4—4 of Figure 1, and

Figure 5 is a perspective of the top portion of the valve plug.

Referring to the drawing, reference numeral 10 designates generally a valve body having a conical seat 11 formed therein. Diametrically opposite ports 12 and 13 communicate with the seat and debouch into coupling portions 14 and 15 of any suitable design. The seat 11 terminates upwardly in an enlarged cylindrical bore 16 which is surmounted by an annular shoulder 17 above which is an internally threaded neck 18. Downwardly, the body terminates in an externally threaded neck 19 coaxial with the seat 11.

The plug generally indicated at 20 includes a metal core portion 21 which has secured thereto, or formed thereon, a covering or surfacing 22 of rubber and by the term "rubber" is meant any suitable rubber-like material whether of natural or synthetic composition. As here shown the core portion 21 is of conical form and the covering 22 is constituted by a jacket of uniform wall thickness vulcanized on the core portion. Obviously it is only necessary that the external surface of the plug be complementary to the seat and accordingly, where the rubber sleeve forms a part of the plug, the core 21 may be of any suitable cross section and may be fluted or otherwise conformed in order to provide a secure anchorage for the rubber.

The plug 20 is provided with a diametrical passage 23, extending through both the core 21 and the sheath 22, adapted to connect ports 12 and 13 when the plug is in the position shown in Figures 1 and 2 so that flow is permitted, the fully closed position of the plug being at 90° to that shown. At its larger end the plug is provided with an axial bore 24 communicating with passage 23 and with a counterbore 25 which extends to the lower end of the plug. A spring seating cup 26 is freely received in the counterbore 25 and is urged against the shoulder 27 by means of a compression spring 28 which bears at its other end against a cap 29 threaded on neck 19. Cup 26 is provided with an opening 30 which connects bore 24 with counterbore 25 and the chamber 31 existing between the lower end of the plug and cap 29. Port 12, which is the inlet port, is in connection with chamber 31 by means of a groove 32 formed in the seat 11 and consequently when the valve is closed the pressure on the inlet side, having access to chamber 31, will assist spring 28 in tightly seating the plug.

At its upper end the plug has a coaxial annular flange 32' which is formed as a part of the core 21 and this flange is provided in opposite portions thereof with diametrically opposite identical symmetrical notches 33 and 34. Notch 33 has at its inner end the cam surfaces 35 and 36 which are outwardly inclined to axially extending surfaces 37 and 38. The cam surfaces are of identical inclination and meet downwardly at the point 39. Notch 34 has the cam surfaces 40 and 41 and the upright surfaces 42 and 43.

An operator for the plug, generally indicated at 44, has a cylindrical portion 45 freely rotatable in an opening defined by a ring 46 threaded into neck 18 against a gasket 47 on shoulder 17. Operator 44 has an annular flange 48 which is adapted to bear against a shoulder 49 of ring 46 as a thrust member. Outwardly of portion 45 operator 44 has a T-portion 50 engageable by a turning tool and inwardly flange 48 is conically merged into an axially extending boss 51 which preferably is substantially square as shown in Figure 4. Immediately adjacent the base of flange 48, boss 51 is provided with a bore 52 perpendicular to opposite ones of the boss faces and normal to the axis of operator 44, the latter being coaxial with plug 20. A double headed pin 53 is received in bore 52 and on its projecting ends rotatably carries a pair of rollers 54 and 55 which are received in notches 33 and 34 of the plug, boss 51 being received freely within flange 32' so that the plug is guided only by its seat. Rollers 54 and 55, which constitute abutment members, have the form of frusta and the cam faces of the notches are substantially complementarily upwardly inclined toward the axis of the plug. With the plug fully seated the normal relation of the parts is such that while the rollers 54 and 55 are substantially directly above the bottom points of the notches the operator 44 has a slight vertical play which is positively limited by ring 46.

Assuming that with the parts in the position shown torque is applied to the T 50 in a clockwise direction, roller 54 will engage cam surface 33 and roller 55 will simultaneously engage cam surface 41 with the result that the plug will be forced downwardly to loosen it in seat 11.

The rollers rotate on the cam surfaces or inclines and are so related to the latter as to substantially eliminate slipping. That is to say, the angularity of the frusta is so chosen that, while bearing on the cam surfaces with a line contact, the rolling action is secured throughout. It will be understood that the rollers are ordinarily clear of the lower conical surface of flange 48, but the latter is sufficiently near the rollers as to back them up in case of extraordinary stresses. When the rollers come against the abutment surfaces 37 and 43 of the notches, preferably with a line contact, rotation of the operator is positively imparted to the plug. When the operator is released the plug immediately rises and the rollers are cammed back to their central position in the notches and when the plug is in open position the T stands in line with ports 12 and 13, whereas in closed position the T is in a plane normal to the axis of the ports. In order to limit the plug to a 90° turn between fully open and fully closed positions, a radially extending finger 56 is set in the flange 57 at the lower end of the core 21 and cooperates with suitably placed abutments 58 and 59 formed in the neck 19.

It will be understood that in the closing movement of the plug the rollers coact with the opposite notch surfaces 36, 40 and 38, 42.

Assuming the plug to be in closed position and a pressure line to be connected with coupling 14, the rubber will be highly compressed against the downside of seat 11 and will consequently project slightly within port 13, the plug being forced slightly off center. This means that the rollers 54 and 55 will not be exactly above the bottom points of the notches, surfaces 35 and 40 (assumed to be those adjacent port 12) being slightly further under the rollers than surfaces 36 and 41. However, due to the slight axial play of operator 44 the plug is not cammed downwardly so as to loosen it. When it is now sought to open the plug by turning operator 44 in a counterclockwise direction, roller 55 will operatively engage cam surface 40 before roller 54 is effective against cam face 36. Roller 55 therefore exerts a displacing as well as a torsional effect on the plug and acts eccentrically on the latter to move it substantially bodily toward port 12 before the plug is substantially depressed. This bodily movement although slight, tends to move out of port 13 the portion of the rubber covering which has been bulged into the latter and bearing or abrading effects are thus minimized. When the plug has been righted by the action just described both rollers coact with their associated cam surfaces so that force is symmetrically applied to the plug to lower it and then turn it. Of course, the thinner and harder the rubber covering, the less it is bulged in the outlet port.

The disclosure herein is merely illustrative and it will be understood that changes may be made in the form and manner of association of the parts without departure from the invention as defined in the following claim.

We claim:

A valve comprising a body having a conical seat and lateral inlet and outlet ports communicating with said seat, a conical rotary plug member in said seat, said plug including a core portion with a covering of rubber and having a passage therethrough adapted to connect said ports, said plug member being normally urged against and guided only by said seat but being axially displaceable away from the latter, and a rotary operator member for said plug member carried by said body in coaxial relation with and at the small end of, said plug member and limited as to axial displacement away from the latter, one of said members having axially extending flange portions provided with axially faced notches opposed on a diameter which extends longitudinally of said passage, each of said notches having opposed similar cam surfaces at its inner end inclined outwardly to opposed abutment surfaces at its outer end, the other of said members having diametrically opposite abutment members disposed in said notches in the zone of said cam surfaces, but having a slight play relative to the latter upon turning of said operator member; the arrangement being such that with the plug closed in use and urged by fluid pressure toward said outlet port so as to bulge the rubber covering into the latter, the turning of said operator member will first cause one of said abutment members to engage one of said cam surfaces which is adjacent said inlet port whereby to right said plug and withdraw the bulged rubber covering from said outlet port, continued turning of said operator member causing both of said abutment members to act on cam surfaces to depress said plug member and then on abutment surfaces to rotate said plug member.

FRANK H. MUELLER.
CLARENCE PIPPIN.